Sheet 1 - 2 Sheets.

Prentiss, Philbrick & Parsons,

Oil Still,

No. 2,317 Reissued July 17, 1866.

Witnesses:
J. E. Shaw
Geo. E. Buckley

Inventors.
Elijah Freeman Prentiss
William S. Philbrick
William J. Parsons
by their atty
J. H. Reading

Prentiss, Philbrick & Parsons,

Oil Still,

No. 2,317. Reissued July 17, 1866.

Witnesses:
J. E. Shaw
Geo. E. Buckley

Inventors.
Elijah Freeman Prentiss
William D. Philbrick
William J. Parsons
by their atty L. Deming

UNITED STATES PATENT OFFICE.

ELIJAH FREEMAN PRENTISS, OF PHILADELPHIA, PENNSYLVANIA, AND ROBERT ADAM ROBERTSON, OF LIVERPOOL, ENGLAND; SAID ROBERTSON ASSIGNOR TO WM. D. PHILBRICK AND WM. J. PARSONS, OF BOSTON, MASSACHUSETTS.

APPARATUS FOR DISTILLING ROCK-OIL AND OTHER HYDROCARBONS.

Specification forming part of Letters Patent No. 41,858, dated March 8, 1864; Antedated July 31, 1862; Reissued July 17, 1866, No. 2,317.

*To all whom it may concern:*

Be it known that we, ELIJAH FREEMAN PRENTISS, now of the city of Philadelphia and State of Pennsylvania, and ROBERT ADAM ROBERTSON, of Liverpool, England, have invented a new and useful Improvement in Apparatus for Distilling Rock-Oil, Well-Oil, or other Hydrocarbons; and we do hereby declare the following to be a full and exact description of the same, reference being had to the annexed drawings, making a part of this specification, in which—

Figure 1:
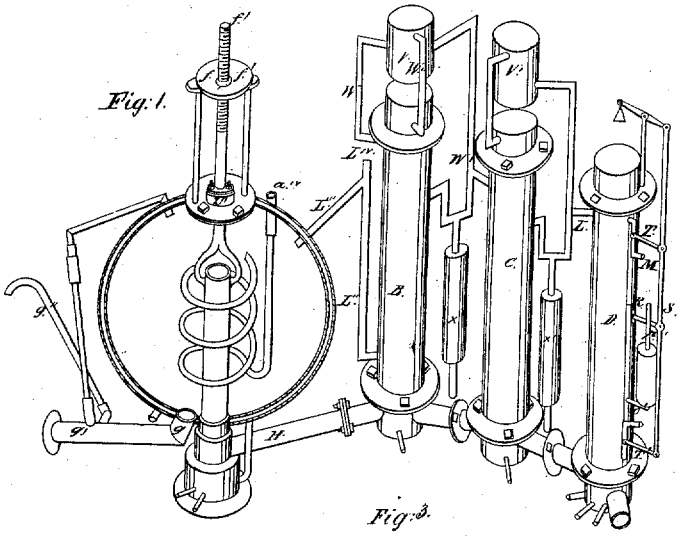
Figure 3:
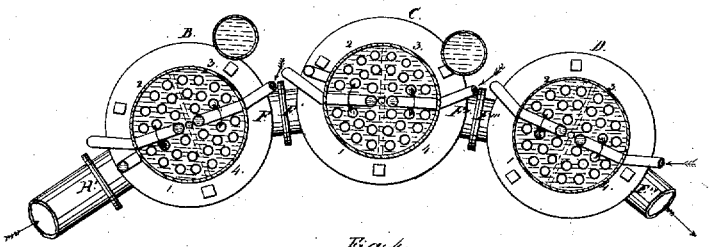
Figure 4:
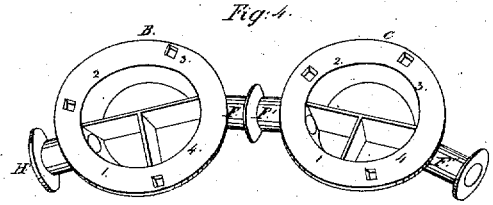
Figure 5:
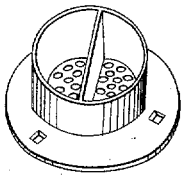
Figure 2:
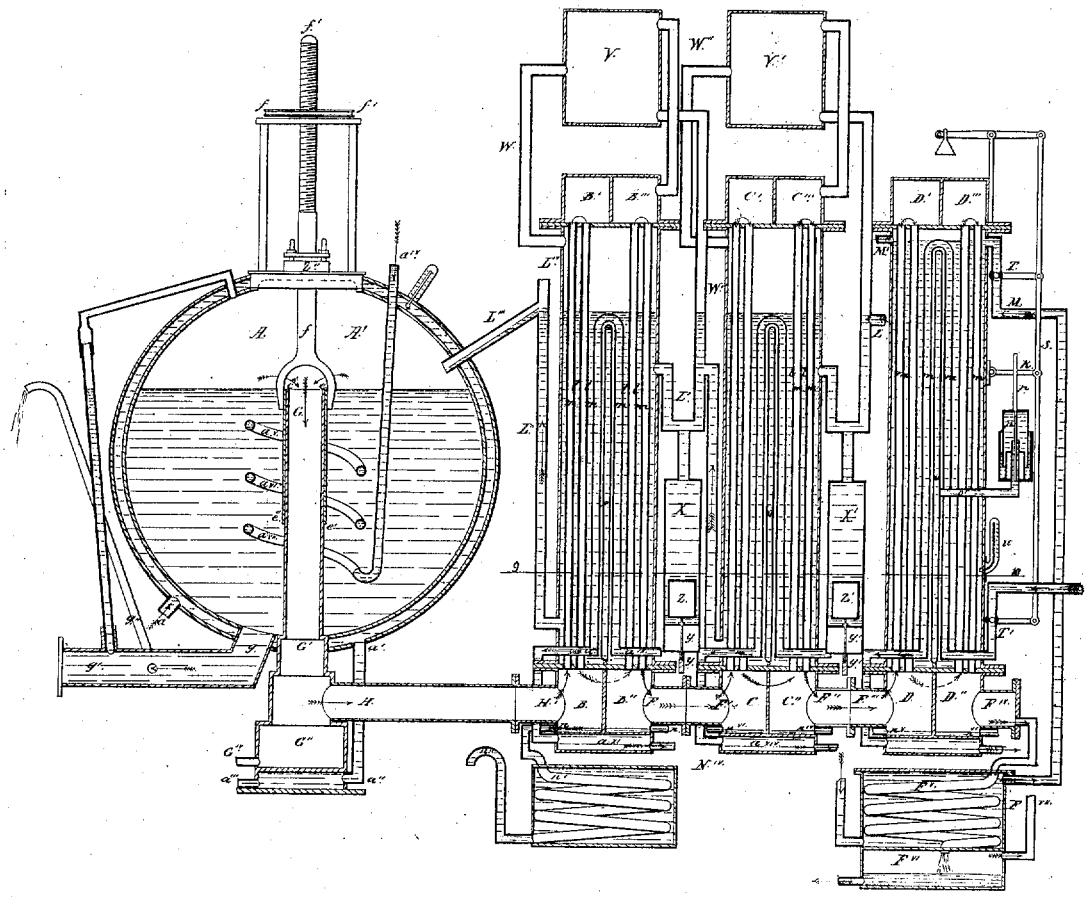

Figure 1, is a side view of the apparatus employed (the globular still being cut away to show the internal arrangement); Fig. 2, a vertical section through the entire apparatus supposed to be filled, and in full operation; Fig. 3, a horizontal section corresponding to Fig. 2, and taken on the line 9—10, of Fig. 2; showing also in dotted lines the partitions dividing the chambers at the tops of the columns. Fig. 4, is a perspective view of the castings forming the bases of the different columns showing the internal partitions for directing the currents of vapor into the proper quadrants; Fig. 5, a similar view of the castings forming the tops of the columns showing the partition for directing the currents of vapor, said partition being at right angles with the longer partition of the bases.

The improvement has for its object the obtaining of various classes of products by the distillation of petroleum coal oil and other hydrocarbons.

By using the number of columns shown in the drawings these products are produced, 1st lubricating oil, 2nd burning oil, 3rd a substitute for turpentine, 4th benzin, and these results are obtained by the combination of a still with a series of condensing chambers or columns through which the vapors from the still are passed, the first column being set and maintained at a temperature proper for condensing the lubricating oil, say about 360° Fah. to 400° Fah., the second being maintained at a temperature proper for condensing burning oil, say about 260° Fah., the third at a temperature proper for condensing the liquids fit to be substituted for turpentine, say about 160° Fah., and finally the benzin and other condensable products of the vapor are condensed in a cold worm. The crude oil is passed or fed into the still through two of the series of condensing columns so that the oil operates as condensing baths to the vapors. There is also secured a quiet ebullition in the still by roughening the surface of the injecting steam coil and there is secured a uniformity in the several temperatures of the respective columns above mentioned by attaching to each an automatic expanding air regulator or thermostat acting directly upon the supply of steam admitted into the heating pipes of each of the condensing chambers.

Similar letters of reference indicate corresponding parts in the several figures.

In the annexed drawings A, $A^{I}$, represents the still; B, $B^{I}$, $B^{II}$, $B^{III}$, the first condenser; C, $C^{I}$, $C^{II}$, $C^{III}$, the second condenser; D, $D^{I}$, $D^{II}$, $D^{III}$, the third condenser. The still A, $A^{I}$, is constructed of cast iron in a spherical form about 8 feet in diameter and surrounded by a wrought iron jacket, leaving a steam space of about 3 inches. This spherical still is attached to a vertical tube $e$, $e^{I}$, $e^{II}$, $e^{III}$, which terminates in a vertical stem or rod $f$, $f^{I}$, which has a screw cut upon its upper extremity. The vertical tube $e$, $e^{I}$, $e^{II}$, $e^{III}$, slides upon a hollow vertical column of cast iron G, $G^{I}$, $G^{II}$, expanded at its base so as to make a hollow pedestal. This hollow column G, $G^{I}$, $G^{II}$, forms a support for the spherical still and also a tube of escape for the vapors of the boiling crude oil which it contains, the vapors arising from the oil in the still following the directions of the arrows, that is over the top of, into and vertically down through G, $G^{I}$, thence through the cross tubes H, $H^{I}$, thence it ascends through the vertical tubes in column B, $B^{I}$, its course being indicated by the white spaces and also by the arrows as will be more fully described hereafter.

By means of the sliding of the tube $e$, $e^{I}$, $e^{II}$, $e^{III}$, to which the still A, $A^{I}$, is immediately attached upon the column G, $G^{I}$, $G^{II}$, the relative position of the upper extremity of the tube G, $G^{I}$, $G^{II}$, to the surface of the liquid can be changed through the medium of the nut $f$, $f^{I}$, and the screws F, $F^{I}$. Any liquid oil which may accidentally froth over into G, $G^{I}$, $G^{II}$, falls to the bottom of the column and escapes through the escape pipe $G^{IV}$.

The oil is heated in the still A, $A^{I}$ by means of superheated steam introduced from an ordinary boiler and superheating apparatus into the steam jacket *a*, at a temperature of from 700° to 800° Fah., and after circulating around the exterior of the still A, $A^{I}$, passes out and escapes by the passage $a^{I}$ $a^{II}$ $a^{III}$. The superheated steam is also introduced from the superheater directly into the contents of the still A, $A^{I}$, through the tube $a^{IV}$ which terminates in a spiral coil $a^{V}$ $a^{VI}$ $a^{VII}$, having numerous small apertures. The spiral coil $a^{V}$ $a^{VI}$ $a^{VII}$, is roughened on the exterior so as to form a multitude of small points, each being a point of ebullition, in order to disseminate the heat throughout the mass of the contents, and thus secure a quiet ebullition.

There is an aperture or passage of escape for the heavy residuum which would remain in the still A, $A^{I}$. This passage of escape is shown at *g*, $g^{I}$, being a tube leading from the bottom of the still $A^{I}$.

$g^{II}$ is a movable tube attached to *g*, $g^{I}$ so as to form a top sheet when vertical and usually kept open more or less. Through this the heavy greasy or tarry residuum escapes. By moving this tube $g^{I}$, to different elevations the residuum can be drawn more or less freely. The fresh crude oil is constantly fed into the still through the tube L, in the manner presently to be described.

The construction of the three condensing columns B, $B^{III}$, C, $C^{III}$, D, $D^{III}$, is as follows: Each column is composed of a cylinder of copper or other suitable metal about 15 inches diameter and about 8 feet high. The interior is filled with a series of tubes of copper about one inch in diameter say about 88 in number or 22 in each quadrant space. These tubes are attached at the head and base to a perforated plate ½ inch thick. Immediately above and below each column there are chambers shown at $B^{I}$, and $B^{III}$, B and $B^{II}$, $C^{I}$ and $C^{III}$, C and $C^{II}$, $D^{I}$ and $D^{III}$, D and $D^{II}$. These chambers at the bottom serve for cross passages between the extremities of the tubes. The tubes are so arranged that the vapor from the still A entering through the tube G, $G^{I}$, and the cross tube H, $H^{I}$ into the chamber B, will ascend in the tubes which are white or uncolored on one quarter of the circle as shown by the arrow to the top chamber $B^{I}$ where it will pass across and descend through a corresponding set of tubes marked white. Referring to Fig. 3, part B, which is the base of B, $B^{III}$, the course of vapor will be more distinctly shown. The vapor ascends through the tubes in quadrant marked "1", to the top chamber where it passes across and descends through the quadrant marked "2", to the bottom chamber, where it ascends through quadrant marked "3" to the top and descends through quadrant marked "4", where it passes on to the next column C, passing through the tube F, $F^{I}$, into the chamber C, where it ascends and descends successively through the tubes marked white in the quadrants of C, respectively marked 1, 2, 3, and 4, in the same manner in which it ascended and descended through the 4 quadrants of B. Thence it passes out of quadrant 4 of column C, through $F^{II}$ $F^{III}$ into D, and here it ascends and descends successively through the tubes marked white in the quadrants marked 1, 2, 3, and 4, respectively the same as described in reference to columns B and C, thence it passes out through $F^{III}$, into a common condensing worm $F^{V}$, and a tank $F^{VI}$, whence the uncondensable gases are led off through a safety pipe $F^{VII}$, to the top of the building.

The crude oil is brought into the still in the following manner: The pipe L is connected with a reservoir of crude oil; this pipe leads into the side of column C, $C^{I}$, and the oil fills the space *l*, *l*, *l*, between the tubes *m* to the height shown, which space is colored green to indicate that it is filled by the oil. The oil introduced into this space obviously surrounds and makes a bath for the vapor tubes *m* (not colored) before described. After filling the space around the vapor tubes in C, $C^{III}$, the crude oil passes across through $L^{I}$, into the space around the vapor tubes in B, $B^{III}$, and after surrounding and forming a bath for the vapor tubes *m* in B, $B^{III}$, it passes thence through $L^{II}$, $L^{III}$, into the still A. An auxiliary mode of filling the still A, at starting can be had through an auxiliary attachment at $L^{IV}$, direct with the reservoir of crude oil. In the column D, $D^{III}$, instead of introducing crude oil into the space around the vapor tubes, cold water is introduced from the tub inclosing the worm $F^{V}$, to form a bath for the vapor tubes (colored yellow in the drawings). The water escapes through the waste pipe $M^{I}$.

The operation of the apparatus is as follows, viz: The still and the first two columns being filled with crude oil to the levels shown in Fig. 2, and the third column being filled with water, superheated steam is admitted within the outside jacket of the still A, at *a* and also through the steam tubes of the different columns until they attain the different degrees of heat at which the columns are to be set when the regulating apparatus attached to each column is put in gear. Then superheated steam is injected into the still through $a^{IV}$, $a^{VII}$, $a^{VI}$, $a^{V}$. The vapor driven off by the heat so obtained rises above and passes through G, $G^{I}$, and H, $H^{I}$, into and through the vapor tubes *m*, of the column B, $B^{III}$. The vapor in passing through these vapor tubes of B, $B^{III}$, is partially condensed by the crude oil bath marked green, which surrounds them. This crude oil in B, $B^{III}$, is maintained at any desired temperature, say 400° Fah., and the liquid condensed at that temperature falls down the tubes into the chambers at the bottom of the column and may be separately drawn off through three separate worms, one worm for each compartment of said chamber, or, as shown by the drawings through one worm at *n* and finally is received into a tank at $n^{II}$ in the form of lubricating or heavy oil. The worm $n^{I}$ is formed as shown having its delivering end raised outside of the worm tub a little above the surface of the cold water to prevent any thing but oil from passing. The vapor which is not condensable at the heat the column is fixed at passes on through F, $F^{I}$, to and through the vapor tubes in column C, $C^{III}$, where it encounters the bath of crude oil in the green spaces at a temperature of 300° Fah., or such other degree of heat as may be desired, and the liquid condensed at this temperature descends through the vapor tubes into the bottom of C, $C^{III}$, whence it passes off through $N^{III}$, into a worm or worms similar to that under the column B, $B^{III}$, and is drawn off in the form of burning oil at $N^{IV}$. The vapor which is not condensed in the last named column passes on through $F^{II}$, $F^{III}$, to the vapor tubes in column D, $D^{III}$, which are surrounded with water (shown yellow) maintained at any desired temperature, say 160°. The liquid condensed at that temperature descends into the chambers at the bottom of column D, $D^{III}$, when it passes off through $n^{V}$ and $n^{VI}$ into a cooling worm or worms similar to that under the column B, $B^{III}$, and is then drawn off in the form that we call "turps" or a substitute for turpentine. The vapor which is not condensable in this column passes out at $F^{IV}$, into another worm $F^{V}$, in which it is surrounded with cold water and thus condensed, and drawn off at $F^{VI}$, in the form of bezin. Any remaining incondensable vapor passes off through a waste pipe $F^{VII}$.

The regulation of the temperature in the respective columns is effected by means of a sealed air-tube O (colored red) which connects by a cross tube $O^{I}$, with a small inverted cup P, resing on a mercury bath and attached by a stem $P^{I}$ to the lever R, which lever raises and lowers the rod S, which rod S works the throttle T, which admits the cold water and the throttle T which admits steam to the column D, $D^{III}$. When the heat in the column D, $D^{III}$, rises above 160°, or the temperature the column may be set at, the air in O expanding is forced into the interior of the inverted cup P, and elevates it, carrying up the lever R, and the rod S, thereby throttling the steam at $T^{I}$, and opening the cold water supply at T and the cup P descends and reverses the action at $T^{I}$ and T respectively whenever the air in O, falls to a temperature lower than 160°, or the temperature the column is set at. The degree of heat is ascertained in the first instance from the thermometer inserted into the column as at U, Fig. 2, a separate thermometer being inserted in each of the oil columns for a similar purpose. The temperature of 360° in B, $B^{III}$, and of 260° in C, $C^{III}$, or the temperatures at which those columns have ben respectively set, are maintained by a similar apparatus operating on the crude oil to be admitted on the one hand and upon the steam on the other hand, in like manner as is above described for D, $D^{III}$. We have attached to the tops of the two columns B, $B^{III}$, and C, $C^{III}$, auxiliary chambers V, $V^{I}$, the use of which is to separate any oil which may be carried up by the vapor from the boiling spaces (shown colorless) at the top of the columns. Thus if the vapors and oil together ascend through W, into the chamber V, the oil falls to the bottom of V, and finds it way back into the crude oil, through the tube $W^{I}$. The vapors ascend to the top of V, and pass off through $W^{II}$ into the head of the column B, $B^{III}$, and mix with the vapors passing into the column C, $C^{III}$. A similar arrangement is attached to the top of C, $C^{III}$, for a similar purpose.

There is a portion of condensed steam or water which finds its way along with the vapor into B, $B^{III}$, and into C, $C^{III}$. A small portion of this steam is condensed in the chambers V and $V^{I}$ and the water forms and collects in the water legs X and $X^{I}$ and escapes from the bottom of these water legs through taps Y and $Y^{I}$. These taps are opened and closed by floats Z and $Z^{I}$, which rise in water and fall in oil, hence when there is any water there, they float and open the tap and when it has gone the floats fall and shut the taps. The bottom of the main hollow stand in which the still A rests is heated by the means of steam introduced through the passage $a^{I}$ $a^{II}$ into $a^{III}$. A similar arrangement of steam passage $a^{IX}$, $a^{X}$, $a^{XI}$, maintains the temperature in B, $B^{III}$, and in the chamber at the bottom of B, $B^{III}$, and so of the column C, $C^{III}$, by the steam passage $a^{XII}$, $a^{XIII}$ and $a^{XIV}$.

The number of columns B, $B^{III}$, C, $C^{III}$, and D, $D^{III}$, may be increased to any extent, each column being set and maintained at a different temperature and separating a distinct product effecting in fact a continuous fractional distillation. The crude oil may be fed through more than two columns on its way to the still, if deemed advisable.

Having thus described the improvement what we claim as the invention of the said

PRENTISS and ROBERTSON and desire to secure by Letters Patent is—

1. The combination of the still A, the injecting worm $a^{IV}$ $a^{VI}$ $a^{VII}$ and the central tube G, $G^{I}$, $G^{II}$.

2. Roughening the surface of the injecting worm or tube $a^{V}$ $a^{VI}$ $a^{VII}$ to render the ebullition regular and quiet.

3. The combination of the still A, with the series of columns two or more, each column being set and maintained at the temperature necessary to separate the product condensable at such temperature, whereby at one continuous operation the crude oil is separated into the various products due to condensation at the different temperatures fixed upon.

4. The arrangement of the vapor tubes and oil spaces in columns B, $B^{III}$, or C, $C^{III}$, whereby the crude oil on its way to supply the still A, is made to act as a condensing bath to the vapors in these columns, coming from the still A.

5. The arrangement of the columns B, $B^{III}$ and C $C^{III}$ in combination with the still A and the movable exit tube $g^{II}$ whereby the operation of the still is rendered continuous.

6. The air regulator or its equivalent for regulating the temperature of the respective columns or either of them in combination with the pipes of supply of the heating and cooling media.

7. The water legs X and the floats Z, for regulating the escape of water from the columns.

8. The auxiliary heads V $V^{I}$ for enabling the oil-bath in each column to act as a still.

9. The warming of the bottoms of the chambers which are at the bases of the columns by means of steam chambers arranged and operating as shown above.

10. The warming of the bottom of the column on which the still A, is supported substantially as above described.

11. The arrangement of the column B, $B^{III}$ so as to act immediately as a still to C, $C^{III}$, and the column C $C^{III}$ so as to act as a still to D $D^{III}$ and so on if crude oil is fed into the main still through more than two columns.

12. The arrangement of the oil spaces in B, $B^{III}$ and C $C^{III}$ in combination with the still A, whereby the operation of the still is made continuous, and the fresh oil is introduced at a high temperature into the still A.

E. FREEMAN PRENTISS.

W. D. PHILBRICK,
WM. J. PARSONS,
*Assignees of Robert Adam Robertson.*

Witnesses to the signature of E. F. P.:
J. E. SHAW,
GEO. BUCKLEY.
Witnesses W. D. P and W. J. P.:
D. DUDLEY HALL,
ARTHUR REED.

[FIRST PRINTED 1911.]